United States Patent [19]

Eslinger et al.

[11] 4,110,647
[45] Aug. 29, 1978

[54] WHEEL SPEED SENSOR

[75] Inventors: Ralph Gilbert Eslinger; John Millar Nicolson, both of Elyria, Ohio

[73] Assignee: The Bendix Corporation, Southfield, Mich.

[21] Appl. No.: 759,170

[22] Filed: Jan. 13, 1977

[51] Int. Cl.² .............................................. H02K 19/20
[52] U.S. Cl. ................................... 310/168; 310/67 R
[58] Field of Search ....................... 310/168, , 67, 155; 329/173, 174; 188/181 R

[56] References Cited

U.S. PATENT DOCUMENTS

| 3,596,122 | 7/1971 | Stewart | 310/67 |
| 3,916,234 | 10/1975 | Stigall et al. | 310/168 X |
| 3,949,252 | 4/1976 | Riesenberg et al. | 310/168 |

Primary Examiner—Donovan F. Duggan
Attorney, Agent, or Firm—Ken C. Decker; William N. Antonis

[57] ABSTRACT

A wheel speed sensor for a vehicle adaptive braking system is installed within the vehicle hub cap so that the hub cap and speed sensor assembly are installed on the vehicle wheel as a unit. The speed sensor includes a rotor assembly which is rotatable with the hub cap, and a stator assembly which includes a bearing which slidably and rotatably receives a spindle which is integral with the hub cap. A tang projects from the stator assembly and is received in a corresponding slot on the vehicle axle to prevent relative rotation between the sensor assembly and the axle. A spring is provided which rotates with the hub cap and which yieldably urges the stator into engagement with the end of the vehicle axle. Consequently, the hub cap and sensor assembly are installed and removed from the vehicle as a unit, thereby facilitating installation of the sensor assembly since the air gap between the stator and the rotor may be set at the place of manufacture of the sensor assembly.

15 Claims, 3 Drawing Figures

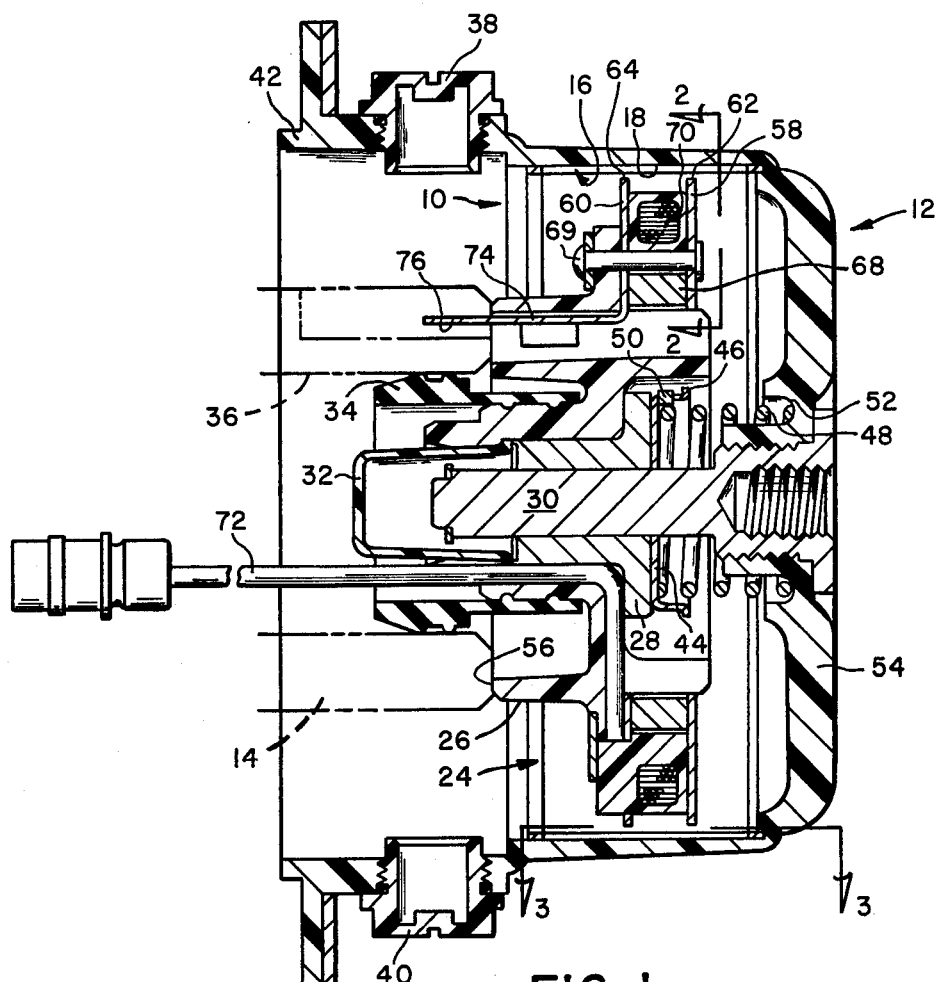
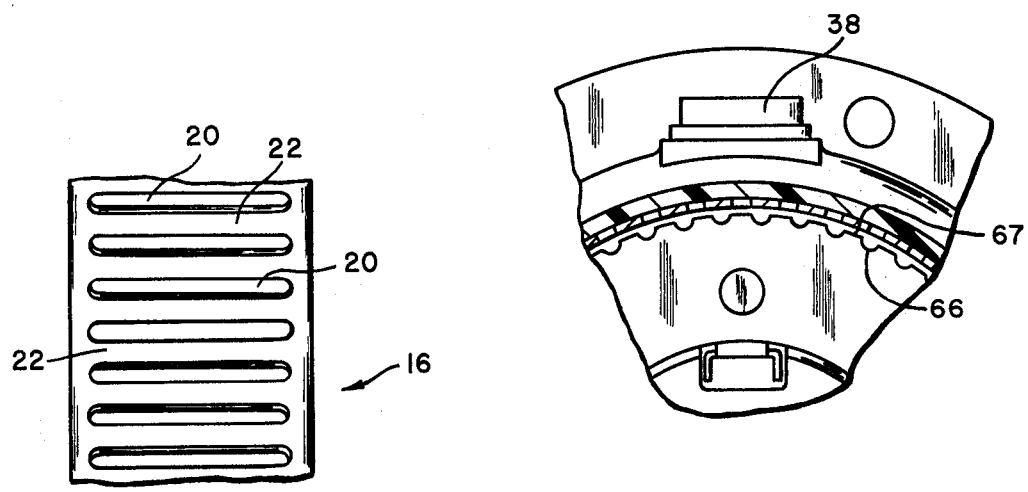

WHEEL SPEED SENSOR

BACKGROUND OF THE INVENTION

This invention relates to a speed sensing assembly for a vehicle adaptive braking system.

Speed sensing assemblies, which measure the rate of rotation of a vehicle wheel, are critical components of vehicle adaptive braking systems. However, prior art speed sensor designs, although many have worked acceptably, have not been as trouble-free as desired, since most of the prior art speed sensors have consisted of separate rotor and stator assemblies which must be separately installed on a vehicle. In most designs, such as that shown in U.S. Pat. Nos. 3,988,624 and 3,626,226, the critical air gap between the sensing head and the rotor must be set at the time the speed sensor is installed on the vehicle. Even in prior art devices such as disclosed in U.S. patent application Ser. No. 481,938, filed June 21, 1974, owned by the assignee of the present invention, in which the air gap between the sensing head and the rotor is preset when the speed sensor is manufactured, the sensing assembly must be installed separately in the vehicle axle and the vehicle hub cap must be installed separately to transmit rotation of the vehicle wheel to the sensor assembly. The present invention, however, solves most of the problems inherent in prior art speed sensor assemblies, in that the hub cap and sensor unit are a one-piece assembly, which is installed on the vehicle in the same manner as hub caps alone are installed, and requires no attention or adjustment at the time that it is installed upon the vehicle.

SUMMARY OF THE INVENTION

A speed sensor assembly for a vehicle adaptive braking system includes a rotor which is mounted for rotation with the vehicle hub cap, and a stator which includes a bearing assembly which slidably and rotatably receives a spindle which projects from the hub cap. The stator assembly further includes a sensing head which cooperates with the rotor to generate a pulsed output signal representative of wheel speed, and further includes a tang which is received within a slot provided on the end of the vehicle axle to prevent rotation of the stator with respect to the axle. Because of the sliding connection between the stator and the hub cap, a spring is provided to urge the stator into engagement with the end of the axle, the sliding connection between the stator and the hub cap being long enough to accommodate the relatively wide range of tolerances in the dimension between the end of the axle and the hub cap. The rotatable connection between the stator and the hub cap permits installation of the stator and hub cap as a completed assembly so that the stator can be mounted on the hub cap at the place where the speed sensor is manufactured and the stator and hub cap assembly can then be installed on the vehicle at the place that the vehicle is manufactured.

Therefore, an important object of our invention is to facilitate installation of vehicle wheel speed sensors on the vehicles with which they are used, by providing a sensor which is installed upon the hub cap at the place of manufacture of the speed sensor so that the speed sensor and hub cap may be installed on the vehicle as a unit at the place where the vehicle is manufactured.

Another important object of our invention is to provide a wheel speed sensor which is able to accommodate a reasonably wide range of tolerances in the distance between the end of the hub cap and the end of the axle upon which the wheel speed sensor is installed.

Still another important object of our invention is to provide a wheel speed sensor in which the critical air gap between the sensing head and the rotor may be set at the place where the speed sensor is manufactured, instead, of being set at the place where the sensor is installed upon the vehicle.

Still another important object of our invention is to provide a wheel speed sensor which is insensitive to, and protected from, environmental contaminants which might otherwise interfere with the proper operation of the sensor, thereby enhancing the reliability and ease of maintenance of the sensor assembly.

DESCRIPTION OF THE DRAWINGS

FIG. 1 is a transverse cross-sectional view of a speed sensor and hub cap assembly made pursuant to the teachings of our present invention;

FIG. 2 is a fragmentary plan view taken substantially along lines 2—2 of FIG. 1; and FIG. 3 is a fragmentary plan view taken substantially along line 3—3 of FIG. 1.

DETAILED DESCRIPTION

Referring now to the drawings, a wheel speed sensor generally indicated by the numeral 10 is carried within a conventional hub cap generally indicated by the numeral 12. The hub cap 12 is installed on the vehicle wheel (not shown) in the normal manner, rotates with the vehicle wheel, and covers the end of the axle illustrated in phantom at 14. The sensor assembly 10 includes a ringlike rotor generally indicated by the numeral 16 which is secured to the inner circumferential surface 18 of the hub cap 12 for rotation with the hub cap. The rotor 16 is provided with axially extending, circumferentially spaced slots 20 which define teeth 22 therebetween.

The sensing assembly 10 further includes a stator assembly generally indicated by the numeral 24. The stator assembly 24 includes a stator housing 26 which carries a bearing 28. The bearing 28 slidably and rotatably receives a spindle 30 which projects from, and is integral with, the hub cap 12. As can be seen in FIG. 1, the length of the spindle 30 is substantially greater than the axial length of the bearing 28, so that the stator housing 26 may slide relative to the spindle 30 throughout a substantial range. A bearing cap 32 is also carried by the stator housing 26 and extends across the end of the spindle 30, to protect the bearing surfaces on the bearing 28 and spindle 30 from interference by contaminants. A boot 34 is also carried by the stator housing 26, and slidably and sealingly engages the inner circumferential surface 36 of the axle 14. The boot 34 protects the environment inside the hub cap 12 from contaminants which may accumulate in the bore defined by the axle 14, and also prevents oil, which is customarily present within the hub cap 12, from leaking into the axle 14. Fill caps 38, 40 are provided so that the oil supply can be replenished from time to time. The oil bath inside the hub cap 12 lubricates the wheel bearings (not shown) which are located just to the left of the open end 42 of the hub cap.

The rightwardmost face, (viewing FIG. 1) of the bearing 28 defines a thrust surface 44 which acts as a thrust bearing for a spring retainer 46 which is slidably and rotatably mounted on the spindle 30. One end of a spring 48 is provided with a tang 50 which projects through an opening in the spring retainer 46, so that the spring retainer 46 rotates with the spring 48. The opposite end of the spring 48 is received within a recess 52 in the front face 54 of the hub cap 12, so that the spring 48 and spring retainer 46 rotate with the hub cap 12. The spring 48 yieldably urges the stator assembly 24 to the left, viewing FIG. 1, so that the rear face (viewing FIG. 1) 56 of the housing 26 is yieldably maintained into engagement with the end of the axle 14.

The stator assembly 24 further includes a pair of axially spaced, annular, platelike members 58, 60. The outer circumferential surfaces 62, 64 of the members 58 and 60 are provided with serrations as at 66 which define teeth 67 therebetween. Since the teeth 67 and serrations 66 on the outer circumferential surface of the member 62 are identical with the corresponding teeth and serrations on the outer circumferential surface 64 and the member 60, only the serrations on the member 58 are described in detail herein. A ring magnet 68 circumscribes the stator housing 26, and is located between the annular members 58 and 60. Similarly, an electrical coil 70 is also disposed between the annular members 58 and 60 and circumscribes the magnet 68. Circumferentially spaced rivets 69 secure the members 58, 60, the magnet 68, and the coil 70 to the stator housing 26. Electrical lead 72 is provided to connect the coil 70 with the appropriate logic mechanism (not shown) which forms a part of the aforementioned adaptive braking system. The annular member 60 is provided with an axially extending tang 74 which is slidably received within a slot 76 provided in the end of the axle 14. Engagement of the tang 74 and the slot 76 prevents relative rotation between the stator assembly 24 and the axle 14.

MODE OF OPERATION

The reluctance of the magnetic path between the annular member 58 and the annular member 60 through the ring magnet 68 and the rotor 16 will vary appreciably depending upon whether one of the rotor teeth 22 or one of the slots 20 are radially aligned with the teeth 64 on the member 58 and the corresponding tooth on the member 60. During rotation of the rotor, this variance in the magnetic path generates electrical pulses in the coil 70 in a manner well known to those skilled in the art. These pulses, since the rotor 16 rotates with the hub cap 12, will vary in frequency proportional to the speed of rotation of the hub cap 12. The pulses are transmitted to the normal logic module (not shown) in the normal manner through the leads 72.

It will also be noted that the reluctance of the aforementioned magnetic path will vary a great deal depending upon the air gap between the rotor 16 and the teeth 64 on the member 58 and the corresponding teeth on the member 60. Consequently, it is very important that this air gap be held to an extremely tight tolerance. This was somewhat difficult in prior art speed sensors, since these prior art speed sensors generally required that the air gap be set when the speed sensor mechanism is installed on the vehicle. In the present case, however, this air gap can be set at the time of manufacture of the speed sensor, since the speed sensor is installed on the hub cap 12 when the speed sensor is manufactured. Since the clearance between the bearing 28 and spindle 30 is quite small, and since the location of the spindle 30 is held to a relatively close tolerance, the aforementioned air gap can also be held to a relatively tight tolerance in the speed sensor pursuant to the teachings of our invention.

Furthermore, it will also be noted that the axial length of the rotor 16 and the axial length of the spindle 30 is much greater than the distance between the annular members 58 and 60. Since accurate readings may be obtained as long as the annular members 58 and 60 are each disposed within the axial length of the slots 20, the speed sensing mechanism 10 can accommodate a very wide variation in the distance between the end of the axial 14 and the face of the hub cap 54. Consequently, this distance need not be held to a tight tolerance. The sensing mechanism automatically accommodates to this distance at the time the speed sensor is installed on the vehicle, since installation is effected by installing the tang 76 in the slot 74 and by then securing the end of the hub cap to the wheel in the normal manner. The spring 48 automatically urges the end 56 of the stator housing 26 into engagement with the end of the axle 14, so that no adjustments are required at the time that the hub cap 12 and speed sensor assembly 10 are installed upon the vehicle.

We claim:

1. In a vehicle having an axle and a wheel rotatably mounted on said axle, a hub cap covering the end of said axle, a speed sensor assembly comprising a rotor mounted for rotation with said hub cap and a stator carried by said hub cap and including sensing means responsive to relative rotation between the rotor and the stator for generating a signal proportional to the rate of relative rotation between the rotor and the stator, a spindle carried by the hub cap and rotatable therewith, a bearing carried by the stator rotatably receiving said spindle so that the stator is supported by the hub cap and the speed sensor assembly can be installed on the hub cap before the hub cap and speed sensor unit is installed on said vehicle as an assembly, said axle having a slot, said stator carrying a tang received within the slot in the axle to prevent relative rotation between the stator and the axle.

2. In a vehicle having an axle and a wheel rotatably mounted on said axle, a hub cap covering the end of said axle, a speed sensor assembly comprising a rotor mounted for rotation with said hub cap and a stator carried by said hub cap and including sensing means responsive to relative rotation between the rotor and the stator for generating a signal proportional to the rate of relative rotation between the rotor and the stator, a spindle carried by the hub cap and rotatable therewith, a bearing carried by the stator rotatably receiving said spindle so that the stator is supported by the hub cap and the speed sensor assembly can be installed on the hub cap before the hub cap and speed sensor unit is installed on said vehicle as an assembly, said bearing accommodating sliding motion of the stator with respect to the spindle, the length of the spindle being greater than the length of the bearing so that the sliding motion between the stator and the spindle can accommodate variations in tolerances between the end of the axle and the portion of the hub cap covering the end of the axle.

3. The invention of claim 2:
said stator including means cooperating with said axle to prevent relative rotation between the stator and the axle.

4. The invention of claim 2:
the axial length of the rotor being greater than that of the stator so that the stator will be aligned radially with the rotor throughout the range of relative sliding movement between the bearing and the spindle.

5. The invention of claim 4:
therewith, said rotor having axially extending gaps defining teeth therebetween.

6. The invention of claim 5:
said sensing means including an annular member coaxial with said hub cap and having serrations on the periphery thereof defining teeth therebetween corresponding to the teeth defined on the rotor.

7. The invention of claim 5:
said sensing means including a pair of axially spaced annular members, each of said annular members being coaxial with the hub cap and having serrations on the outer periphery of said annular members defining teeth therebetween corresponding to the teeth defined on the rotor.

8. The invention of claim 7:
said sensing means including a ring magnet and a coil radially offset with respect to said magnet, said magnet and said coil being coaxial with the hub cap and disposed between said annular members.

9. The invention of claim 2:
and resilient means located between the stator and the hub cap yieldably urging said stator axially with respect to the spindle into engagement with the end of the axle.

10. The invention of claim 9:
said resilient means being coaxial with said hub cap and rotating therewith.

11. The invention of claim 9:
and a spring retainer restrained for rotation with said spring, said bearing defining a thrust surface engaging said retainer.

12. The invention of claim 2:
said stator including a housing carrying said bearing and said sensing means, said axle defining a bore therewithin, and a flexible boot carried by said housing extending into said bore.

13. The invention of claim 2:
said rotor being a ring secured to said hub cap and coaxial therewith, said ring having axially extending gaps defining teeth therebetween.

14. The invention of claim 13:
said sensing means including a pair of axially spaced annular members, each of said annular members being coaxial with the hub cap and serrations on the outer periphery of said annular members defining teeth therebetween corresponding to the teeth defined on the rotor.

15. The invention of claim 14:
said sensing means including a ring magnet and a coil radially offset with respect to said magnet, said magnet and said coil being coaxial with the hub cap and disposed between said annular members.

* * * * *